United States Patent
Benthien et al.

(10) Patent No.: US 10,442,002 B2
(45) Date of Patent: Oct. 15, 2019

(54) MANUFACTURING OF COMPONENTS OF A VEHICLE USING ADDITIVE LAYER MANUFACTURING

(71) Applicant: Airbus Operations GmbH, Hamburg (DE)

(72) Inventors: Hermann Benthien, Hamburg (DE); Matthias Hegenbart, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 431 days.

(21) Appl. No.: 14/942,466

(22) Filed: Nov. 16, 2015

(65) Prior Publication Data
US 2016/0136891 A1 May 19, 2016

(30) Foreign Application Priority Data
Nov. 19, 2014 (DE) .................. 10 2014 116 938

(51) Int. Cl.
| | | |
|---|---|---|
| *B64C 1/00* | (2006.01) | |
| *B22F 3/105* | (2006.01) | |
| *B22F 7/08* | (2006.01) | |
| *B62D 25/00* | (2006.01) | |

(Continued)

(52) U.S. Cl.
CPC .............. *B22F 3/1055* (2013.01); *B22F 7/08* (2013.01); *B29C 64/153* (2017.08); *B62D 25/00* (2013.01); *B64C 1/12* (2013.01); *B64C 1/1407* (2013.01); *B64C 1/18* (2013.01); *B22F 3/24* (2013.01); *B29K 2083/005* (2013.01); *B29K 2105/251* (2013.01); *B29L 2031/3005* (2013.01); *B29L 2031/3017* (2013.01);

(Continued)

(58) Field of Classification Search
None
See application file for complete search history.

(56) References Cited

U.S. PATENT DOCUMENTS

| | | | |
|---|---|---|---|
| 6,364,250 B1* | 4/2002 | Brinck ...................... B64C 1/12 | 244/119 |
| 2008/0128550 A1* | 6/2008 | Roming .................. B64C 1/061 | 244/119 |

FOREIGN PATENT DOCUMENTS

EP 2873620 A1 5/2015

OTHER PUBLICATIONS

IdeaSpace. IdeaSpace—Idea: A400M Cargo Panels from AIMgSc [online]. [Retrieved on Dec. 17, 2015]. Retrieved from Internet: <URL:http://ideaspace.airbus.corp/1G87/servlet/hype/IMT?userAction=Browse&documentl. . . >.

(Continued)

*Primary Examiner* — Monica A Huson
*Assistant Examiner* — Kelsey C Grace
(74) *Attorney, Agent, or Firm* — Lorenz & Kopf LLP

(57) ABSTRACT

This relates to a method for manufacturing a shell-like structural component for a vehicle using additive layer manufacturing. In a step of the method, a first material is applied to a region of the shell-like structural component. In another step of the method, the region of the shell-like structural component is heated by a laser beam such that the first material is added to the shell-like structural component. The shell-like structural component comprising the first material is cooled in another step such that an internal stress is generated within the shell-like structural component resulting in a bending of the shell-like structural component. This further relates to a shell-like structural component which is manufactured by a method using additive layer manufacturing.

12 Claims, 5 Drawing Sheets

(51) Int. Cl.
    *B29C 64/153*     (2017.01)
    *B64C 1/12*     (2006.01)
    *B64C 1/14*     (2006.01)
    *B64C 1/18*     (2006.01)
    *B29L 31/30*     (2006.01)
    *B33Y 10/00*     (2015.01)
    *B33Y 80/00*     (2015.01)
    *B29K 105/00*     (2006.01)
    *B29K 83/00*     (2006.01)
    *B22F 3/24*     (2006.01)

(52) U.S. Cl.
    CPC .................. *B29L 2031/3076* (2013.01); *B29L 2031/3085* (2013.01); *B33Y 10/00* (2014.12); *B33Y 80/00* (2014.12); *Y02P 10/295* (2015.11)

(56) References Cited

OTHER PUBLICATIONS

Idea I-2012-01827: The Baud Milling Cutter.
Idea I-2012-01878: Attachment solution without fatigue issue.
"Aluminium Magnesium Scandium Fuselage skin application," Airbus Engineering unlimited performance inspired, Centre of Competence Structure, Technologie Vortrag Standort Bremen, presented by Jens ROHDE, Feb. 15, 2013.
IdeaSpace. IdeaSpace—Idea: The Baud Milling Cutter [online]. [Retrieved on Dec. 17, 2015]. Retrieved from Internet: URL:http://ideaspace.airbus.corp/1G87/servlet/hype/IMT?userAction=Browse &documentl . . . >.

\* cited by examiner

MANUFACTURING OF COMPONENTS OF A VEHICLE USING ADDITIVE LAYER MANUFACTURING

CROSS-REFERENCE TO RELATED APPLICATIONS

This application claims priority of German Patent Application No. 10 2014 116 938.7, filed 19 Nov. 2014, which is incorporated herein by reference in its entirety.

TECHNICAL FIELD

The embodiments described herein relate to a manufacturing process for components of a vehicle. In particular, the embodiment relates to a method for manufacturing a shell-like structural component for a vehicle using additive layer manufacturing, a shell-like structural component for an aircraft manufactured by the method and the use of a shell-like structural component in an aircraft.

BACKGROUND

Other objects, desirable features and characteristics will become apparent from the subsequent summary and detailed description, and the appended claims, taken in conjunction with the accompanying drawings and this background.

Nowadays, there exist many different manufacturing processes for manufacturing structural components of vehicles. Such manufacturing processes are in most cases subtractive. For example, subtractive processes are milling, cutting, machining, drilling, etc. These subtractive processes may rely on the principle that a certain part of material is removed from the component in order to change the contours or the shape of the component which may be assembled in a later step. It is also possible to remove material, for example on an uneven surface of a component, such that a high quality of the surface of the component can be achieved. However, subtractive processes may be limited in their application since material is removed from the component. In other words, the material can only be removed as long as sufficient material is left such that the component can still fulfill stability requirements. For example, dents or scratches on surfaces may be repaired by removing a distinct amount of material from the surface such that dents or scratches on the surface of the component disappear.

DE 10 2007 015 795 A1 describes a metal-cutting machining process for a semi-finished product having a predetermined shape and at least one machining surface. In order to protect the surface of the product during the process, a foil is affixed on the surface.

DE 10 2007 026 100 B4 describes a method providing a milling tool with a cutting depth limiter, where maximum cutting depth of the milling tool is limited by the limiter. Therein, a surface section is milled under guidance of the milling tool by the guiding contour. A machining device for machining a laminated composite material at a surface section is also provided.

SUMMARY

According to a first aspect of the present embodiment, a method for manufacturing a shell-like structural component for a vehicle using additive layer manufacturing (ALM) is provided. In a step of the method, a first material is applied to a region of the shell-like structural component. In another step, the region of the shell-like structural component is heated by a laser beam such that the first material is added to the shell-like structural component. In another step of the method, the shell-like structural component comprising the first material is cooled such that an internal stress is generated within the shell-like structural component resulting in a bending of the shell-like structural component. The internal stress may at least be induced in the region of the shell-like structural component and/or near the first material which is comprised by the shell-structural component after cooling. The vehicle may be an aircraft, a car or a rail vehicle.

With this method it is possible that the contour or shape of the shell-like structural component may be adapted in an assembled state, for example if it is assembled in the vehicle. In other words, the internal stress which is generated within the shell-like structural component after applying the first material to the shell-like structural component induces a stress or force that bends the shell-like structural component such that a certain or predetermined shape of the shell-like structural component which comprises the first material may be provided. The internal stress may be generated by using different materials for the shell-like structural component and the first material. For example, the first material may be applied to a surface of the shell-like structural component or only a part of the surface of the shell-like structural component. In case the first material is applied to only a part of the surface of the shell-like structural component, it is possible to induce internal stresses within the shell-like structural component only in a region around or near the applied amount of first material on the surface of the shell-like structural component. In this manner, only a part of the shell-like structural component may be deformed by the internal stresses. This deformation may appear as a bending or twisting of the shell-like structural component. However, the first material may be applied to distinct locations on the surface of the shell-like structural component in order to induce internal stresses near these locations such that the mechanical resistance of the region near the applied first material is improved.

The material may also be applied to the shell-like structural component such that the first material is located within or inside the shell-like structural component. In other words, first material may not only be applied to the surface of the shell-like structural component but also inside the shell-like structural component. This may be achieved by providing a layered structure in which a layer of the first material is located between parts of the shell-like structural component. Using additive layer manufacturing, the different layers may be applied subsequently.

When applying the first material to the region of the shell-like structural component, the first material may be a powder which is supplied to the region of the shell-like structural component by a powder supply unit. This powder may be a metallic or non-metallic powder which is, when applied to the region of the shell-like structural component, heated and/or melted. By melting the first material and a part or a region of the shell-like structural component, a connection or continuity between both the first material and the shell-like structural component may be achieved; e.g. the first material is mixed with and/or firmly bonded to the region of the shell-like structural component. For heating or melting the first material and/or the region of the shell-like structural component, different methods may be used, such as selective laser melting (SLM). The heating of the shell-like structural component and the first material may be provided by a laser beam. The heating of the region of the shell-like structural component by the laser beam may be conducted during the application of the first material to the region of the shell-like structural component. In this manner, it is ensured that parts of the shell-like structural component within the region are melted when the first material is applied. By melting the first material as well as the region of the shell-like structural component, it is possible that this part or region of the shell-like structural component may be firmly bonded to the first material such that a continuity between the first material and shell-like structural component is provided.

By cooling the shell-like structural component and the first material, melted parts of the first material as well as the shell-like structural component may be solidified. After solidification, the internal stress within the shell-like structural component is generated. The internal stress being generated after solidification may be limited to the regions where the first material has been applied to the shell-like structural component. The internal stress provides an enhanced mechanical robustness or resistance in the regions within the shell-like structural component to which the first material has been applied. The internal stress may also generate a bending force that bends the shell-like structural component such that it may adopt a predetermined form or shape.

The shell-like structural component may be a plate with a curved surface or only an even plate with no curvature. However, the shell-like structural component may be a three-dimensional solid which comprises several materials. The shell-like structural component may be manufactured from metallic or non-metallic materials. The shell-like structural component may be a part of a large structural component of the vehicle. For example, the shell-like structural component is a sidewall panel that comprises a curved or even surface. It is possible that the shell-like structural component comprises a thickness of between 5 millimeters whereas its lateral dimensions, e. g. length and width, are more than one meter. It should be mentioned that the thickness of the shell-like structural component is equal to or greater than 5 millimeters. For example, the thickness is 100 millimeters. However, the lateral dimensions are usually much greater than the thickness of the shell-like structural component. The length and width may be measured along the curved or even surface of the sell-like structural component. Generally, the shell or a shell-like structural component is a three-dimensional structural element with a small thickness when compared to other dimensions of the structural element. A plate is a three-dimensional structural element whose thickness is very small when compared with other dimensions of the structural component. However, the shell-like structural component may withstand high mechanical loads, such as a traversing vehicle or passenger.

According to an embodiment, the first material is applied to a plurality of regions of the shell-like structural component from different directions.

This can be achieved by using a multi-direction additive manufacturing process. It is possible that the first material is applied from different directions simultaneously such that the time for producing the shell-like structural component may be reduced and a better accessibility to every region of the shell-like structural component is achieved.

According to another embodiment, a bending direction is opposite to a direction of a force which acts on the shell-like structural component when it is installed in the vehicle, wherein the force is generated by a cargo unit standing on the shell-like structural component or by cabin air pressure.

The bending which is due to the internal stress within the shell-like structural component generates a deflection of at least a part of the shell-like structural component. In other words, the shell-like structural component may be curved such that a convex shape and therefore a deflection in a direction which is substantially parallel to the thickness of the shell-like structural component is provided. The deflection of the shell-like structural component may be much smaller than its width or length. The deflection is dependent on the thickness of the shell-like structural component and/or on the distance between the supports of the shell-like structural component. If the shell-like structural component is supported by two beams, which will be described in the detailed description of the figures, the deflection of the shell-like structural component is dependent on the distance between the beams and on the thickness of the shell-like structural component. Moreover, the force may act on the surface of the shell-like structural component in a direction which is opposite to the deflection of the shell-like structural component. In this manner, the deflection of the shell-like structural component is reduced. In particular, the bending of the shell-like structural component by the internal stress is directed opposite to a load direction which may occur during operation of the vehicle. Such loads or forces may be pressure forces for example. In other words, the force may be generated by a cabin pressure or a pressure difference between the cabin pressure and the environmental pressure during flight of an aircraft. The forces may also be generated by a mass of a cargo loading unit which is placed on the shell-like structural component or the dead load of the shell-like structural component. However, the force may be a gravitational force. The bending direction is a direction into which at least a part of the shell-like structural component is deflected when relative to attachment points of the shell-like structural component. For example, if two edges of the shell-like structural component are fixed by attachments or bearings, the deflection of the part of the shell-like structural component that is between the attachments or bearings indicates the direction of the bending of the shell-like structural component. A similar case is shown in more detail in the description of the drawings.

According to another embodiment, a layered structure of the shell-like structural component is generated by applying the first material to the surface of the shell-like structural component. The layered structure comprises a layer of the first material and the shell-like structural component.

The thickness of the layer of the first material may be the same at every region on the surface of the shell-like structural component, but it may also vary such that different thicknesses of the layer of the first material occur at different regions on the surface of the shell-like structural component. There may also be more than one or two layers of the first material. For example, there may be a plurality of layers of the first material as well as a plurality of layers of the shell-like structural component such that the layered structure is composed by many different layers. However, layers of other materials may additionally be added to the layer of the first material and/or to the shell-like structural component.

For example, the layer of the first material is applied to two different sides, e. g. on the surfaces of the shell-like structural component such that the shell-like structural component is arranged between both layers of the first material. In this case, the first material is applied to the shell-like structural component by heating both the shell-like structural component and the first material. After cooling the layered structure comprising the shell-like structural component and the two layers of first material, internal stresses may occur as a result of different thermal expansion characteristics of the first material and the shell-like structural component. In other words, the first material and the shell-like structural component may have different coefficients of thermal expansion such that the first material contracts faster than the shell-like structural component and vice versa. In case the first material contracts faster than the shell-like structural component, this is, the first material has a higher coefficient of thermal expansion than the shell-like structural component, a tensile stress occurs within the first material whereas a compression stress occurs within the shell-like structural component. Such different coefficients of thermal expansion of the different materials which are connected to each other lead to tensile stresses or compression stresses which deform or bend the shell-like structural component. Therefore, it is necessary that these materials are firmly connected.

According to another embodiment, the internal stress is induced using different materials.

For example, the shell-like structural component comprises another material than the first material which is applied to the shell-like structural component. If both the first material and the shell-like structural component comprise different coefficients of thermal expansion, internal stresses may be generated within regions or near regions to which the first material has been applied to the shell-like structural component when the temperature changes. However, internal stresses may also be generated by adjusting the amount of first material which is applied to the shell-like structural component. In other words, the more first material is applied to the shell-like structural component, the more the shell-like structural component will be influenced by the material characteristics of the first material.

According to another embodiment, the internal stress is induced using different temperatures when heating the region of the shell-like structural component.

In other words, the different material characteristics of the shell-like structural component and the other materials which are applied to the shell-like structural component may be influenced by a heat treatment. The heat treatment may be conducted such that only these parts or regions of the shell-like structural component are heated to which the first material is applied. Generally, the heat treatment using different temperatures or different materials provides the opportunity that after cooling the shell-like structural component and the other materials applied to the shell-like structural component internal stresses are generated such that the bending of the shell-like structural component itself or in combination with the first material is generated. The heat treatment or the arrangement of different materials at the shell-like structural component may be adjusted such that a predetermined bending of the shell-like structural component itself or in combination with the first material or other materials applied to the shell-like structural component can be achieved.

According to yet another embodiment, the shell-like structural component is a floor panel. For example, the floor panel is installed in an aircraft as a passenger floor panel or a cargo floor panel.

After manufacturing the shell-like structural component, e.g. after cooling the shell-like structural component, it may be assembled to other components as to form a part of a vehicle. The first material may therefore be a part of the shell-like structural component. After manufacturing the shell-like structural component, it comprises the first material since it is firmly bonded to the shell-like structural component. For example, the shell-like structural component is a floor panel of the vehicle. The floor panel should have an even surface with no curvature, such as a plate. In a loaded condition, the floor panel is usually bent. This bending is defined by a deflection of parts of the floor panel from a neutral line. By using the described manufacturing method, it is possible that the shell-like structural component comprises a predefined bending due to internal stresses such that the deflection of the floor panel is directed into a direction which is opposite to a direction of a force in a loaded condition of the floor panel. This means that the floor panel is deflected in an opposite direction of the loading direction such that the deflection of the floor panel is reduced or vanishes when the force is applied in a loaded condition.

According to another embodiment, a thickness of the floor panel is between 2 millimeters and 4 millimeters. For example, the floor panel is integrated in a cargo space or a passenger cabin.

Preferably, the thickness of the floor panel is 3 millimeters. The floor panel may comprise different layers of material, e. g. a layered structure, but it may also comprise different alloys with different material characteristics, such as different coefficients of thermal expansion.

According to another embodiment, the first material has a coefficient of thermal expansion which differs from a coefficient of thermal expansion of at least the region of the shell-like structural component to which the first material has been applied.

Using materials with different coefficients of thermal expansion generates internal stresses after firmly bonding the materials and changing the temperatures of the connected materials. In other words, both the first material and the shell-like structural component comprise different coefficients of thermal expansion such that internal stresses are generated due to the different expansion characteristics of the shell-like structural component and the first material. This principle may also be applied to various other materials which are combined to the shell-like structural component and/or the first material. Connecting or firmly bonding two different materials each having an own coefficient of thermal expansion, results in internal stresses occurring as tensile stresses and compression stresses.

According to another embodiment, the shell-like structural component is selected from the group comprising an aircraft cargo floor panel, a part of an aircraft outer skin, a part of an aircraft wing and a part of an aircraft door.

The cargo floor panel of the aircraft may have a thickness of preferably 3 millimeters. The cargo floor panel may be deflected in an unloaded condition due to the internal stresses generated within the shell-like structural component such that, if the cargo floor panel is loaded, the deflection may be significantly reduced or even vanish. This aspect will be shown in more detail in the description of the drawings. The part of the outer skin of the aircraft may be connected to stringers or ribs such that, in an unloaded condition, the part of the outer skin is deflected in a region where there is no connection between the part of the outer skin and the ribs or stringers. Usually in flight, the inner pressure within the fuselage is higher than the outer pressure of the aircraft. This difference in pressure during cruise flight generates a force which pushes the parts of the outer skin, which are not connected to ribs or stringers, into the direction of the lower pressure, e.g. outwards or to the outside of the aircraft. Using the shell-like structural component of the described manufacturing method, results in a bending or deflection of the part of the outer skin in the direction opposite to the direction into which the part of the outer skin is pushed due to the pressure loads. This reduces the deflection of the part of the outer skin. In this manner, the aerodynamic characteristics of the outer skin of an aircraft may be positively influenced since no deflections or reduced deflections at the outer skin occur. The same applies to an aircraft door, which means that the aircraft door is deflected due to internal stresses such that, in a loaded condition, for example during flight, the aircraft door adapts an ideal form, e.g. the aircraft door may be aligned with the outer skin of the aircraft. Furthermore, an aircraft wing is bent or deflected in a loaded condition. This means that the deflection of the aircraft wing during flight differs from the deflection of the aircraft wing during ground operation. By a bending or a deflection which is opposite to the loading direction of the wings during flight, improved flight characteristics can be achieved, for example a reduced aircraft drag. The deflection which is opposite to the loading direction of the wing may be induced by internal stresses generated within the part of the aircraft wing, e. g. the parts of the wing to which the shell-like structural component has been attached. This is also explained in more detail in the description of the drawings. If within the description the word "ideal" is used, it may refer to advantageous mechanical or aerodynamic characteristics being achieved by the adaption of certain shapes or contours. Thus, it may mean that certain mechanical or aerodynamic characteristics or behaviors of components of the vehicle may be enhanced.

According to yet another embodiment, the first material is selected from the group comprising silicon, ion, copper, manganese, chromium, tin, vanadium, titanium, bismuth, gallium, lead, aluminum and zirconium.

Furthermore, synthetic materials may also be used for the first material and/or the shell-like structural component. Alloys comprising different metallic or non-metallic materials may also be a suitable composition for the first material and/or the shell-like structural component. It is possible to use multiple metal or plastic materials for the manufacturing or printing process to create a shell-like structural component which comprises different metal or plastic alloys to generate the needed specific properties at each location of the shell-like structural component. The needed alloy is produced or generated during the three-dimensional printing process. It should be noted that the additive manufacturing of the shell-like structural component may also be called printing process since the first material is added to the shell-like-structural component in order obtain the ready-made shell-like structural component which comprises the first material.

According to another embodiment, the first material may be applied to the surface of the shell-like structural component such that an extrusion protruding on the surface of the shell-like structural component, e. g. a protrusion on the surface of the shell-like structural component is provided. These protrusions may be manufactured from a synthetic material.

Moreover, the protrusions itself may comprise different materials which are applied to the surface of the shell-like structural component. The material or materials may be applied such that a fiber-reinforced body, for example on the surface of the shell-like structural component, is generated. Therefore, metal fibers or carbon fibers may be used to strengthen or reinforce a matrix material, like for instance plastics. These fiber reinforced materials which are applied or printed to the surface of the shell-like structural component may reduce crack propagation within the shell-like structural component. In other words, the fiber-reinforced protrusions may effectively prevent a further opening of the crack surfaces. Furthermore, theses protrusions may have an arbitrarily shaped cross-section, wherein the cross-section is obtained ether tangentially or perpendicularly to the surface of the shell-like structural component. An arbitrary cross-section of the protrusions may be obtained using printing process like selective laser melting and/or additive layer manufacturing.

Additionally, the integrated fibers induce a thermal tensioning or stress within the shell-like structural component due to the different coefficients of thermal expansion of the different materials such that a crack initiation is avoided. In other words, the integrated fibers induce an inherent compressing stress which is induced by different thermal expansions of the different fiber materials and/or different matrix materials.

According to another embodiment, the first material is applied to the shell-like structural component in a fibrous form. For example, the protrusions may comprise high-strength fibers. Such protrusions, especially those comprising fibers, may provide an enhanced fatigue and damage tolerance.

According to another embodiment, the shell-like structural components are used as stiffening means. Such stiffening means may be used to strengthen certain parts of an aircraft fuselage, for example corners of a door frame. In this manner, shell-like structural components may be used at the corners of a door of an aircraft fuselage such that so-called corner doublers, which are usually integrated at said corners, may be replaced. The stiffening of the corners may be provided by induced internal stresses within the shell-like structural components leading to an improved fatigue and damage tolerance. The shell-like structural component may be attached near the door of the aircraft, e. g. at the corners of the door.

According to another embodiment, a stress within the shell-like structural component is generated by shot-peening and flare fitting. Shock-peening is understood as a working process used to produce a compressive residual stress layer and modify mechanical properties in components. In this manner, the mechanical properties of the shell-like structural component may locally be influenced so as to enhance the durability and robustness of the shell-like structural component. The stresses generated by flare-fitting may also result in an improvement of the durability and the mechanical robustness of the shell-like structural component. Flare fitting is a working process using a mandrel that is forced into the end of a hole or a tube-like element in order to form a flare by cold working. For example such holes may be placed within the shell-like structural component. Flare-fitting generates stresses in a region around or near the holes or tube-like elements of the shell-like structural component such that the stresses enhance the durability or robustness in these regions. It should be mentioned that shock-peening and flare-fitting may also be used in order to generate a stress within components, e. g. the shell-like structural component, such that these components adapt a predetermined shape as a result of the internal stresses. The adaption of a predetermined shape may occur as a bending of the component.

According to another aspect, an internal stress exists within the shell-like structural component for an aircraft which results in a bending of the shell-like structural component. A bending direction of the shell-like structural component is opposite to a direction of a force which acts on the shell-like structural component when it is installed in the vehicle. The force is generated by a cargo unit standing on the shell-like structural component or by cabin air pressure. The internal stress which exists within the shell-like structural component may be induced by a working process like additive layer manufacturing, selective laser melting, shock-peening or flare fitting.

According to another aspect, a use of a shell-like structural component on an aircraft is provided.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
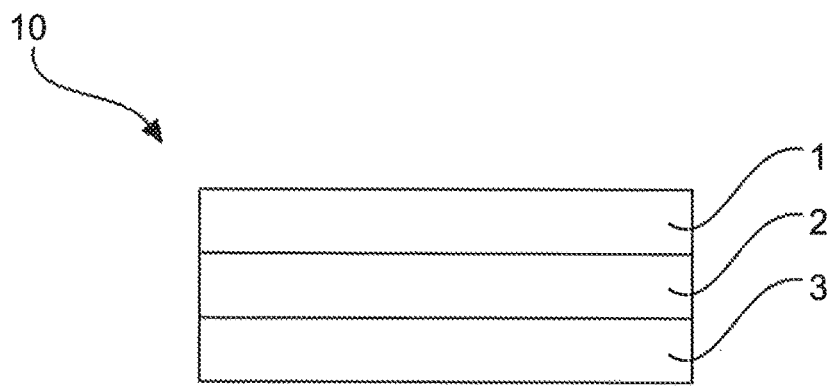
FIG. 1 shows a cross-sectional view of a layered structure with different materials according to an embodiment.

Items shown in the Figures are not drawn to scale. In FIG. 1 a cross-sectional view of a layered structure 10 with different layers of material is shown. The layered structure 10 may be at least a part of a shell-like structural component, which shell-like structural component may be used in a vehicle such as an aircraft, a car or a rail vehicle. The shell-like structural component may thus be a part of an outer skin of an aircraft, a floor panel of an aircraft or a part of a door of an aircraft. The layered structure 10, which is shown in FIG. 1, comprises three different material layers. For example, a first layer 1 and a third layer 3 are made of the same material and a second layer 2 which is arranged between the first layer 1 and the third layer 3 is made of a material that is different from the material of the first layer 1 and the third layer 3. The material of the first layer 1 and the third layer 3 may be aluminum and the material of the second layer 2 may be titanium. As shown in FIG. 1, the geometrical dimensions of the first layer 1 and the third layer 3 are identical such that a symmetrical impression of the composition of the layered structure 10 may be obtained. The layered structure 10 may be manufactured by additive layer manufacturing and/or selective laser melting such that, after connecting the different layers of the layered structure 10, a metallic continuity between the layers can be achieved; e. g. the different layers may be firmly bonded. When changing the temperature of the layered structure 10, e. g. when cooling the layered structure 10 after the manufacturing process, internal stresses are generated within the layered structure 10 because titanium and aluminum have different coefficients of thermal expansion. In other words, titanium has a smaller thermal expansion or elongation than aluminum when equally changing the temperature of both materials which leads to internal stresses within every layer of the layered structure 10.

Figure 2:
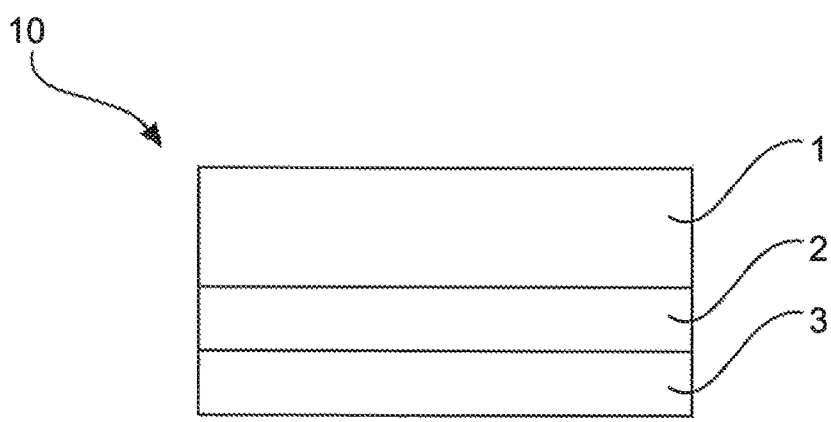
FIG. 2 shows a cross-sectional view of a layered structure with different thicknesses of the layers according to an embodiment.

FIG. 2 shows cross-sectional view of a layered structure 10 with an unsymmetrical design in which the first layer 1 is thicker than the third layer 3. In this example the first layer 1 and the third layer 3 are made of aluminum and the second layer 2, which is located between the first layer 1 and the third layer 3, is made of titanium. The layered structure 10 may as well be manufactured using additive layer manufacturing and/or selective laser melting such that a metallic continuity is provided between the first layer 1 and the second layer 2 as well as between the second layer 2 and the third layer 3. However, the different layers may be firmly bonded. In this manner, it is possible that a internal stress within the layered structure 10 is induced or generated if the temperature of the layered structure 10 is changed. This is due to the different coefficients of thermal expansion or the expansion characteristics of different materials. In this case, titanium has a lower coefficient of thermal expansion than aluminum.

Figure 3:
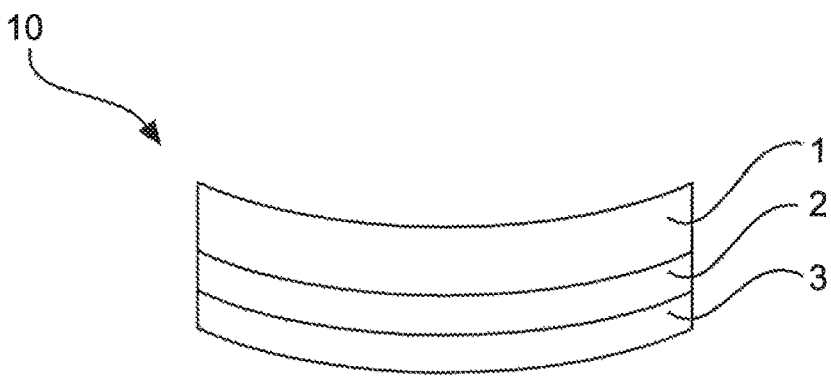
FIG. 3 shows a cross-sectional view of a layered structure which is deformed as a result of internal stresses within the layered structure according to an embodiment.

As a result of the induced internal stresses, the layered structure 10 may be deformed, as shown in FIG. 3. The deformation may appear as a bending or twisting of the layered structure 10. The cross-sectional view in FIG. 3 indicates a bending of the layered structure 10. The bending is generated by internal stresses being induced by the firmly bonded arrangement of layers of the layered structure 10 combined with changes in temperature to which the layered structure 10 is subjected. For example, the layered structure 10 is not bent when it is manufactured by additive layer manufacturing at relatively high temperatures whereas a bending, as shown in FIG. 3, occurs when cooling the layered structure 10 to environmental conditions. In this case, the first layer 1 is thicker than the second layer 2 and the third layer 3. The unsymmetrical arrangement of the different layers may induce internal stresses within the layered structure 10 and the occurrence of internal stresses in turn results in the bending visualized in FIG. 3. By the method for manufacturing the shell-like structural component using additive layer manufacturing, a predetermined bending of the layered structure 10 may be achieved such that a predetermined deflection as a result of the bending of the layered structure 10 is provided. This deflection may advantageously compensate a deformation which is due to external loads.

Figure 4:
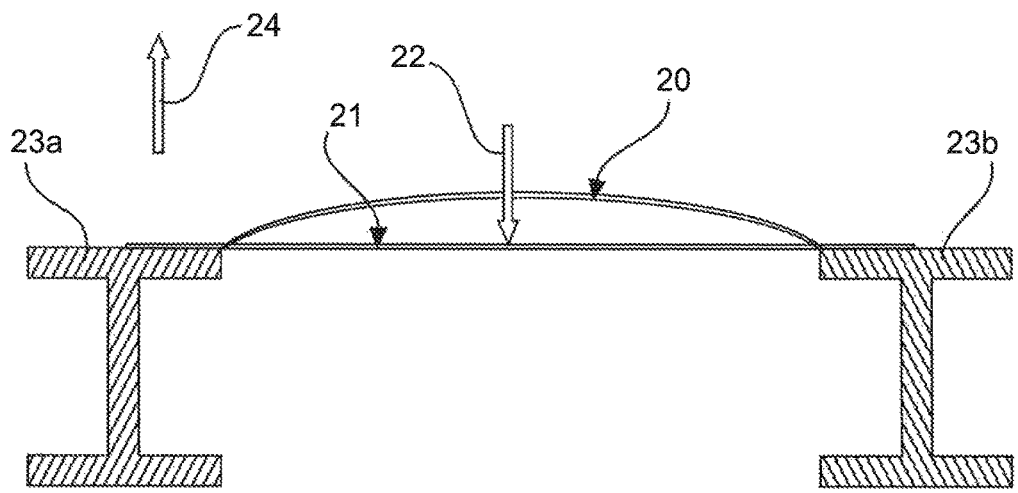
FIG. 4 shows s sectional view of a shell-like structural component in an unloaded condition and in a loaded condition according to an embodiment.

FIG. 4 shows a sectional view of a shell-like structural component in a loaded condition 21 and in an unloaded condition 20, wherein the shell-like structural component is attached to two beams 23a, 23b. A first end of the shell-like structural component is attached to a first beam 23a and a second end of the shell-like structural component is attached to a second beam 23b. It should be mentioned that the items shown in FIG. 4 are three-dimensional objects, like for instance a cargo floor panel that is supported by two beams 23a, 23b. The beams, which are also called cross beams, may be extruded aluminum profiles connected by friction stir welding. A front view of this arrangement is chosen for simplicity. In the unloaded condition 20, the shell-like structural component is bent in such a way that at least a part of it is deflected into a first direction 24 which indicated by an arrow. Thus the first direction 24 indicates the bending direction. This bending is due to internal stresses induced by providing different materials within a certain region or certain regions of the shell-like structural component which for instance comprises a layered structure. If an external load is applied to the shell-like structural component in a second direction 22 which is indicated by another arrow, the shell-like structural component is pushed into the second direction 22 opposite to the first direction 24. In other words the bending direction 24 is substantially parallel and/or opposite to the loading direction 22. However, in the loaded condition 21, the deflection or bending of the shell-like structural component may be reduced. The loaded condition 21 visualized in FIG. 4 indicates that the bending or the deflection of the shell-like structural component may even vanish if a distinct load is reached. The internal stresses may be induced within the shell-like structural component such that a predetermined bending or deflection occurs when a certain force or load is applied to the shell-like structural component in the loaded condition 21. In other words, the internal stresses within the shell-like structural component and hence the bending of the shell-like structural component may be adapted by using the described manufacturing method. Applying the first material to well-chosen regions of the shell-like structural component by additive layer manufacturing, provides the possibility to predetermine the deformation and with it the bending of the shell-like structural component with respect to changes of environmental conditions, such as pressure differences or temperature differences. Therefore, the shell-like structural component may adopt a shape which provides enhanced operating conditions of the vehicle into which the shell-like structural component is integrated.

Figure 5A:
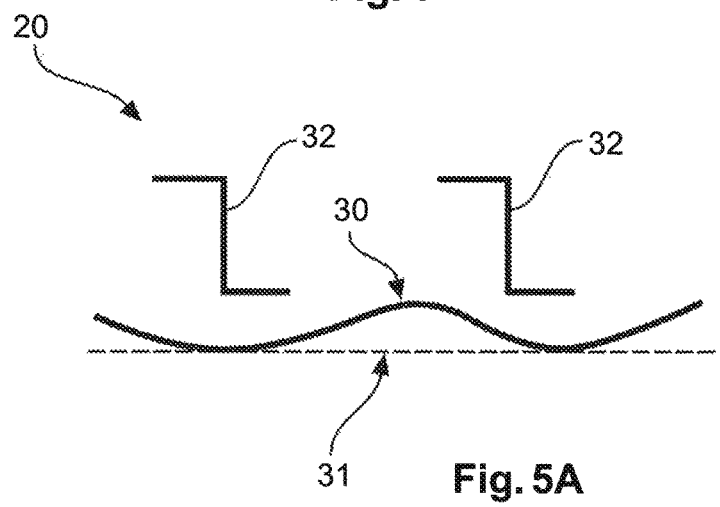
FIG. 5A shows a sectional view of stiffening units and a part of an outer skin of an aircraft fuselage in an unloaded condition according to an embodiment.
Figure 5B:
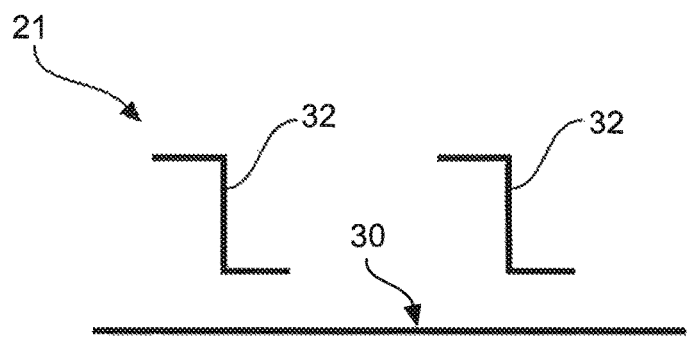
FIG. 5B shows a sectional view of stiffening units and a part of an outer skin of an aircraft fuselage in a loaded condition according to an embodiment.

FIG. 5A shows sectional view of two stiffening units 32 and a part of an outer skin 30 of an aircraft fuselage in an unloaded condition 20 and FIG. 5B shows the same in a loaded condition 21. For simplicity, the stiffening units 32 are drawn as if they are detached from the outer skin 30. In a ready-made aircraft fuselage, the stiffening units 32 are attached to the outer skin 30. The stiffening units 32 may be stringers or ribs. The part of the outer skin 30 may be the shell-like structural component which is manufactured by the described method. In the unloaded condition 20 the shell-like structural component is bent or deformed such that a corrugated shape is adopted. This corrugated shape is the result of the internal stresses induced by the manufacturing process of the shell-like structural component. An ideal contour 31 is also shown in FIG. 5A. The ideal contour 31 describes a condition of the part of the outer skin 30 which is characterized by a reduced drag during flight of the aircraft. This ideal contour 31 is adopted by the part of the outer skin 30 in the loaded condition 21 which is described in FIG. 5B. The pressure difference between the inside of the aircraft fuselage and the outside of the aircraft fuselage during cruise flight causes a load on the part of outer skin 30 such that a linear shape of the part of the outer skin 30 is adapted. The part of the outer skin 30 may substantially be aligned with the ideal contour 31 such that, in a loaded condition 21, a reduced drag can be achieved. Generally, the deformation of the part of the outer skin 30, which may be the shell-like structural component, may be generated by internal stresses within the part of the outer skin 30 induced by the described method such that the part of the outer skin 30 adopts an aerodynamically improved shape if a certain pressure difference or temperature change is reached; e. g. the part of the outer skin 30 follows the ideal contour 31.

Figures 6A, 6B:
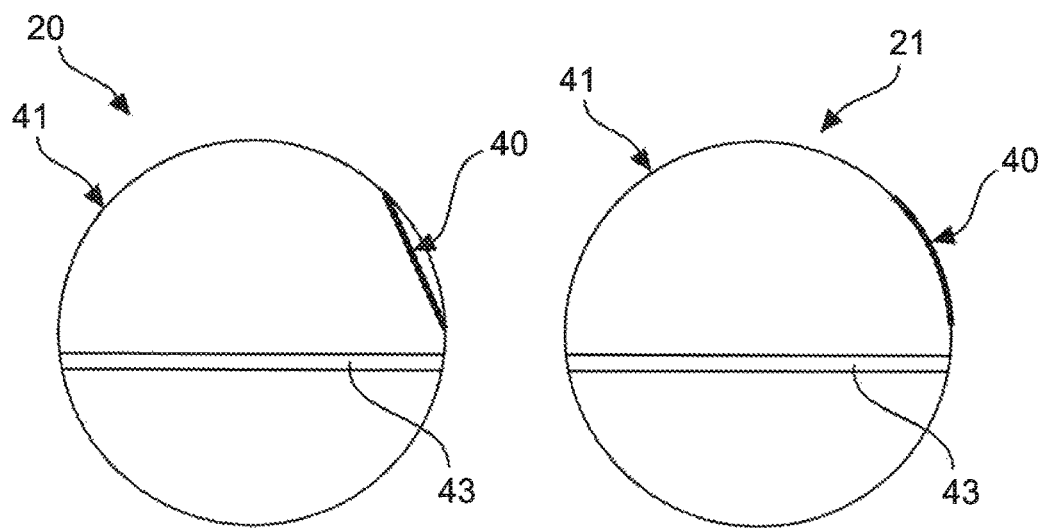
FIG. 6A shows a cross-sectional view of an aircraft fuselage with an integrated aircraft door in an unloaded condition according to an embodiment.
FIG. 6B shows a cross-sectional view of an aircraft fuselage with an integrated aircraft door in a loaded condition according to an embodiment.

FIG. 6A shows a cross-sectional view of an aircraft fuselage with an integrated aircraft door 40 in an unloaded condition 20. Moreover, a floor 43 within the aircraft fuselage as well as an outer skin 41 of the aircraft fuselage is indicated. The aircraft door 40 may be the shell-like structural component which is manufactured by the described method. The door 40 may be slightly bent in the unloaded condition 20 as shown in FIG. 6A. It is noted that the illustration of the shape of the door is strongly exaggerated. The door 40 may be manufactured by the method, such that, if a predetermined load is applied to the door 40 in a loaded condition 21, it is deformed or bent and therefore substantially aligned with the contour of the outer skin 41 of the aircraft fuselage. The loaded condition 21 is shown in the cross-sectional view of FIG. 6B. In the loaded condition 21 the door 40 is pushed from the inside towards the outside with respect to the aircraft fuselage. This may positively influence the aerodynamic characteristics of the aircraft in a region near the door 40. The principle may generally apply to other structural components of an aircraft, such as a pressure bulkhead. It should be understood that the inside of an aircraft fuselage describes the part of an aircraft which is enclosed by the surrounding outer skin 41 whereas the outside describes the environment surrounding the outer skin 41 or the aircraft fuselage.

Figure 7A:
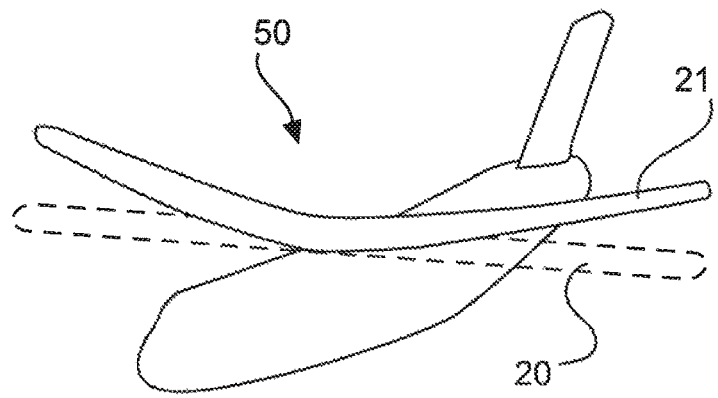
FIG. 7A schematically shows an aircraft with aircraft wings in an unloaded and in a loaded condition according to an embodiment.

FIG. 7A schematically shows a first aircraft 50 with aircraft wings in an unloaded condition 20 and in a loaded condition 21. The first aircraft 50 may be a conventional passenger aircraft. In the unloaded condition 20, e. g. during ground operation, the wings of the first aircraft 50 may adapt the shape indicated by the dashed lines in FIG. 7A. This shape represents an ideal contour which is provided by conventionally manufacturing or assembling the aircraft wings. In the loaded condition 21, e. g. during cruise flight, the wings of the first aircraft 50 are bent or deflected in a vertical direction of the first aircraft 50 such that a deviation from the ideal contour is caused.

Figure 7B:
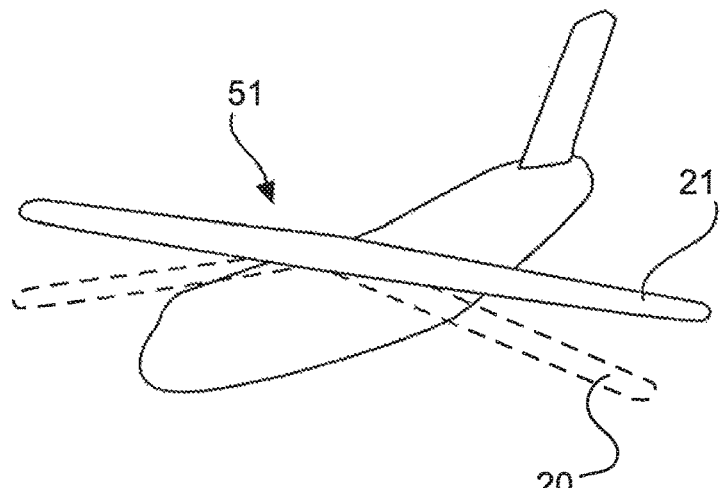
FIG. 7B schematically shows another aircraft with aircraft wings in an unloaded and in a loaded condition according to an embodiment.

In contrast, FIG. 7B schematically shows a second aircraft 51 with aircraft wings in an unloaded condition 20 and in a loaded condition 21, the wings being manufactured by the method according to the embodiment. Therefore, shell-like structural components may be integrated into the wings such that, in the unloaded condition 20, e. g. during ground operation, a bending or deflection of the wings is generated as a result of internal stresses generated by the manufacturing method. The shape or contour of the wings in the unloaded condition 20 is indicated by dashed lines in FIG. 7B. In the loaded condition 21 of the wings of the second aircraft 51, e. g. during cruise flight, the wings may adapt a shape which is substantially equal to the ideal contour. The adaption may be supported by a bending or deflection which is caused by temperature differences between ground operation and cruise flight. The bending may be significantly influenced by temperature differences since the shell-like structural components may comprise different materials, each having distinct coefficients of thermal expansion. In other words, the wings may substantially be adapted to the ideal contour with minimum drag if a certain load in combination with a certain temperature is reached during cruise flight. Adapting the ideal contour of the wings in the loaded condition 21, results in a drag count reduction during cruise flight of the second aircraft 51. This principle may also be used for other applications in which a deformation and bending of shell-like structural components, which are integrated in a vehicle, leads to enhanced aerodynamic characteristics.

Figure 8A:
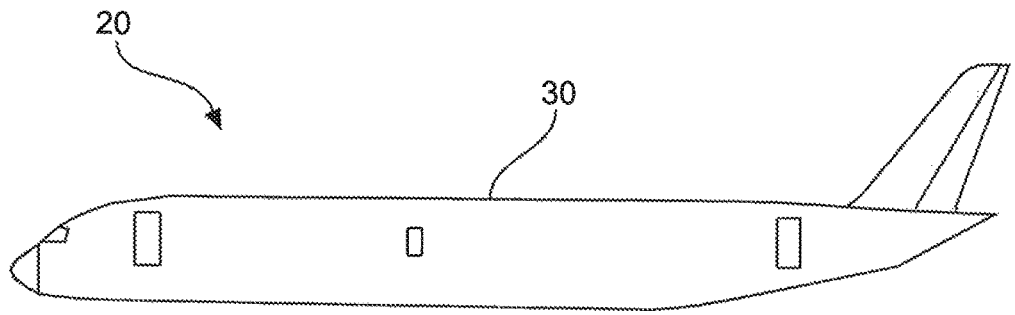
FIG. 8A schematically shows a side view of an aircraft fuselage in an unloaded condition according to an embodiment.
Figure 8B:
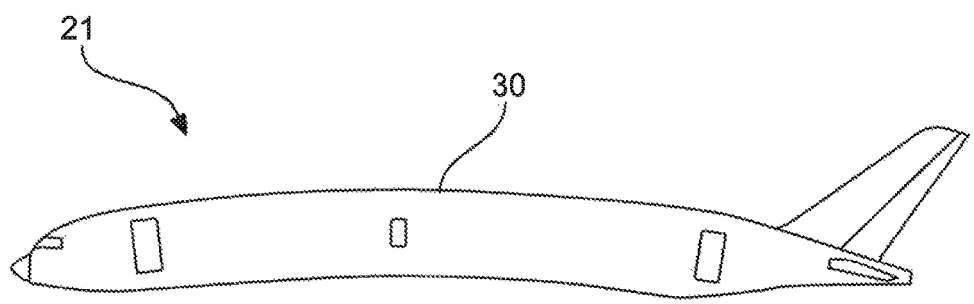
FIG. 8B schematically shows a side view of an aircraft fuselage in a loaded condition according to an embodiment.
Figure 8C:
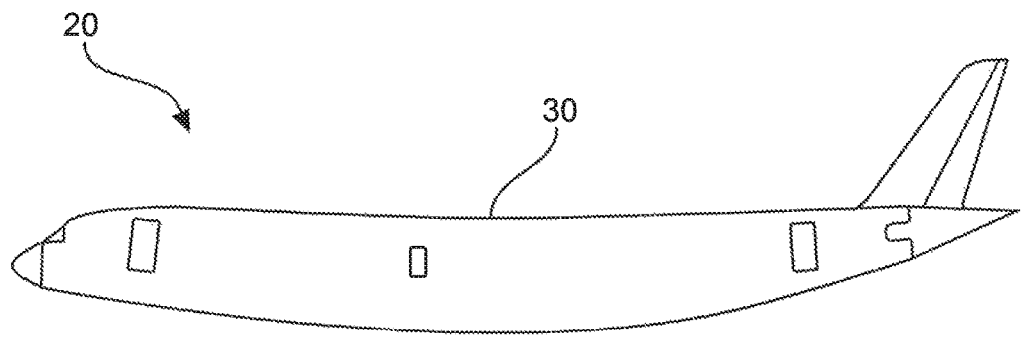
FIG. 8C schematically shows a side view of an aircraft fuselage in an unloaded condition according to another embodiment.

For example, FIG. 8A schematically shows a side view of an aircraft fuselage in an unloaded condition 20. The unloaded condition 20, e. g. during ground operation, is characterized by an ideal contour or shape of the fuselage which would provide a good aerodynamic behavior of the fuselage. This ideal contour or shape is usually not existent anymore during flight since the aircraft fuselage becomes deformed due to external loads, as shown in FIG. 8B. The external loads may for instance be lift forces predominantly acting on the wings. The external loads change the shape of the whole fuselage. This deformation of the fuselage may result in a reduced aerodynamic efficiency. However, the embodiment provides a method for manufacturing shell-like-structural components which may be integrated into the aircraft fuselage, for example as parts of the outer skin 30, such that a deformation or bending of the fuselage in an unloaded condition 20 is generated. This aspect is visualized in FIG. 8C, which shows the aircraft fuselage in an unloaded condition 20, for example after assembling the fuselage on the ground. The generated bending in the unloaded condition 20 may lead to an adaption of the fuselage shape to said ideal contour or shape, as shown in FIG. 8A, in the loaded condition 21. The aerodynamic efficiency in the loaded condition 21, e. g. during flight, may be enhanced by the adaption of the fuselage to the ideal shape. Adaption of the ideal contour or shape means that the induced bending of the fuselage after assembling on the ground is reduced during flight operation.

Figure 9:
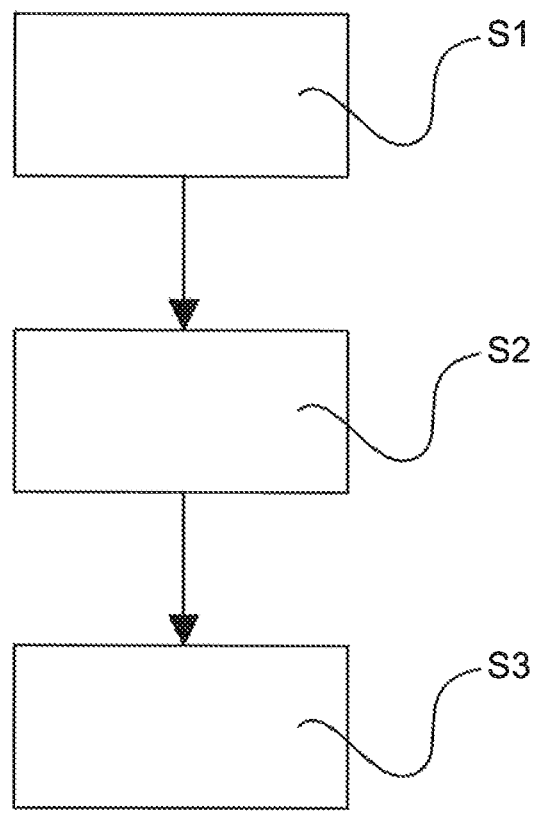
FIG. 9 shows a flow diagram for a method for manufacturing a shell-like structural component for a vehicle using additive layer manufacturing.

FIG. 9 shows a method for manufacturing a shell-like structural component for a vehicle using additive layer manufacturing and/or selective laser melting. The method comprises different steps. In a step S1 of the method, a first material is applied to a region of the shell-like structural component. In another step S2, the region of the shell-like structural component is heated by a laser beam such that the first material is added to the shell-like structural component. For example, a powder bed on the shell-like structural component is heated before applying or printing the first material to the shell-like structural component. The shell-like structural component which comprises the first material is cooled in another step S3 such that an internal stress is generated within the shell-like structural component resulting in a bending of the shell-like structural component. The method may comprise further steps, like for instance changing a temperature and/or a pressure difference such that the shell-like structural component adopts a predetermined geometrical shape.

Applying the first material to the region of the shell-like structural component may be conducted in a multi-direction additive manufacturing process in which the first material is simultaneously applied from different directions and/or to different regions of the shell-like structural component. This provides an accelerated manufacturing of the shell-like structural component.

It should be understood that the first material may be applied onto the surface of the shell-like structural component as well as into the shell-like structural component. Thus, it is also possible that the first material is enclosed by the shell-like structural component, for example in a layered structure. In other words, the first material is comprised by the shell-like structural component.

The method also provides an additive repair process for filling dents or scratches on the surface of the shell-like structural component. The dents or scratches may be filled with Scalmalloy which is an alloy comprising aluminum, magnesium and scandium. Thus, it may not be necessary that the material on the surface of the shell-like structural component has to be removed or scraped by subtractive processes until the dents or scratches vanish.

While the embodiments have been illustrated and described in detail in the drawings and the foregoing description, such illustration and description are to be considered illustrative and exemplary and not restrictive; the embodiments are not limited to the disclosed embodiments. Other variations to the disclosed embodiments can be understood and effected by those skilled in the art and practicing the claimed embodiment, from a study of the drawings, the disclosure, and the appended claims. In the claims the term "comprising" does not exclude other elements, and the indefinite article "a" or "an" does not exclude a plurality. The mere fact that certain measures are recited in mutually different dependant claims does not indicate that a combination of these measures cannot be used to advantage. Any reference signs in the claims should not be construed as limiting the scope of protection.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A method for manufacturing a shell-like structural component for a vehicle using additive layer manufacturing, comprising:
    applying a first material to a region of the shell-like structural component;
    heating the region of the shell-like structural component by a laser beam such that the first material is added to the shell-like structural component; and
    cooling the shell-like structural component comprising the first material, such that an internal stress is generated within the shell-like structural component resulting in a bending of the shell-like structural component;
    wherein internal stresses are induced within the shell-like structural component such that a predetermined bending occurs when a certain force or load is applied to the shell-like structural component in a loaded condition; and wherein the internal stress is induced using different temperatures when heating the region of the shell-like structural component.

2. The method according to claim 1, further comprising: applying the first material to a plurality of regions of the shell-like structural component from different directions.

3. The method according to claim 1, wherein a bending direction is opposite to a direction of a force which acts on the shell-like structural component when it is installed in the vehicle, wherein the force is generated by a cargo unit standing on the shell-like structural component or by cabin air pressure.

4. The method according to claim 1, further comprising: generating a layered structure of the shell-like structural component by applying the first material to the surface of the shell-like structural component, wherein the layered structure comprises a layer of the first material.

5. The method according to claim 1, wherein the internal stress is induced using different materials.

6. The method according to claim 1, wherein the shell-like structural component is a floor panel.

7. The method according to claim 6, wherein a thickness of the floor panel is between 2 millimeters and 100 millimeters, preferably between 2 millimeters and 4 millimeters.

8. The method according to claim 1, wherein the first material has a coefficient of thermal expansion which differs from a coefficient of thermal expansion of the region of the shell-like structural component to which the first material is applied.

9. The method according to claim 1, wherein the shell-like structural component is selected from the group comprising an aircraft cargo floor panel, a part of an aircraft outer skin, a part of an aircraft wing and a part of an aircraft door.

10. The method according to claim 1, wherein the first material is selected from the group comprising silicone, iron, copper, manganese, chromium, tin, vanadium, titanium, bismuth, gallium, lead, aluminum and zirconium.

11. A method for manufacturing a shell-like structural component for a vehicle using additive layer manufacturing, comprising:

applying a first material to a region of the shell-like structural component;

heating the region of the shell-like structural component by a laser beam such that the first material is added to the shell-like structural component; and cooling the shell-like structural component comprising the first material, such that an internal stress is generated within the shell-like structural component resulting in a bending of the shell-like structural component;

wherein internal stresses are induced within the shell-like structural component such that a predetermined bending occurs when a certain force or load is applied to the shell-like structural component in a loaded condition; and wherein additional internal stress is generated within the shell-like structural component by shot-peening and flare-fitting.

12. A method for manufacturing a shell-like structural component for a vehicle using additive layer manufacturing, the method comprising the steps of:

performing a multi-direction additive manufacturing process to print a first material on a first surface of the shell-like structural component and to simultaneously print the first material on a second surface of the shell-like structural component, resulting in a layered structure;

heating regions of the shell-like structural component by a laser beam such that the first material is added to the shell-like structural component; and cooling the shell-like structural component comprising the first material to generate an internal stress within the shell-like structural component, resulting in a bending of the shell-like structural component in an unloaded condition;

wherein internal stresses are induced within the shell-like structural component such that a predetermined bending occurs when a certain force or load is applied to the shell-like structural component in a loaded condition.

* * * * *